INVENTOR
HERMANN WOERRLEIN

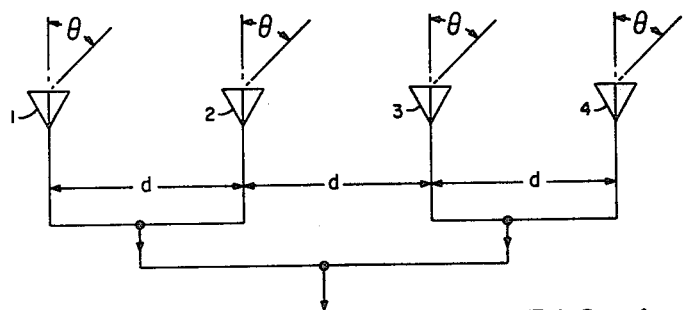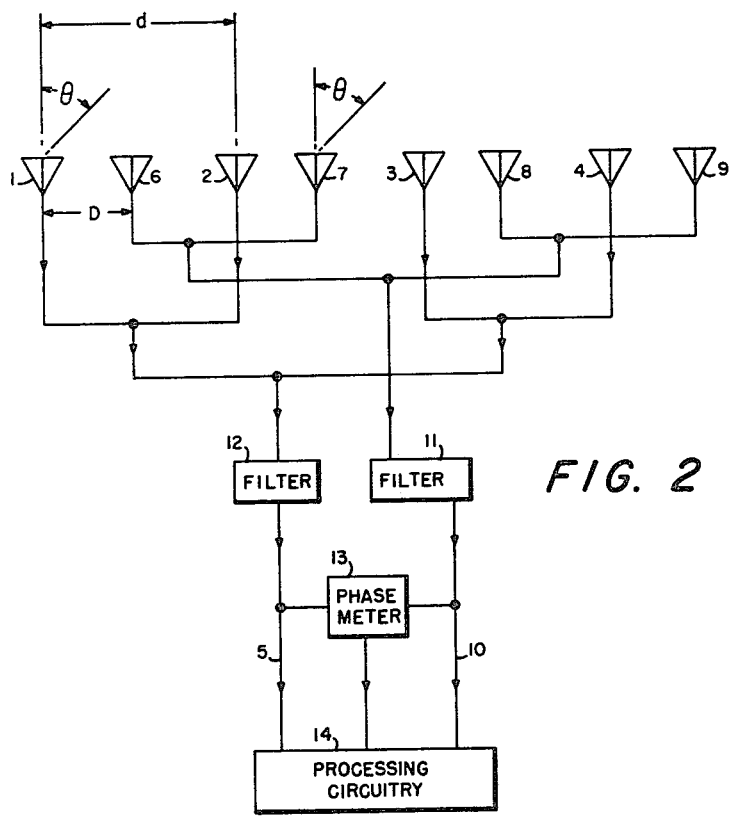

BY
ATTORNEY

United States Patent Office 3,500,414
Patented Mar. 10, 1970

3,500,414
THINNED ANTENNA ARRAY WITH REDUCED GRATING LOBE AMBIGUITIES
Hermann Woerrlein, Dunkirk, Md., assignor to the United States of America as represented by the Secretary of the Navy
Filed Oct. 25, 1968, Ser. No. 770,473
Int. Cl. G01s 5/02
U.S. Cl. 343—113   7 Claims

ABSTRACT OF THE DISCLOSURE

A receiving antenna apparatus for use in a radar system to identify grating lobes in a radiation pattern by measuring the phase difference of signals in two linear arrays displaced one from the other, the elements of one array located between adjacent elements of the second array.

---

Figures 3A, 3B:
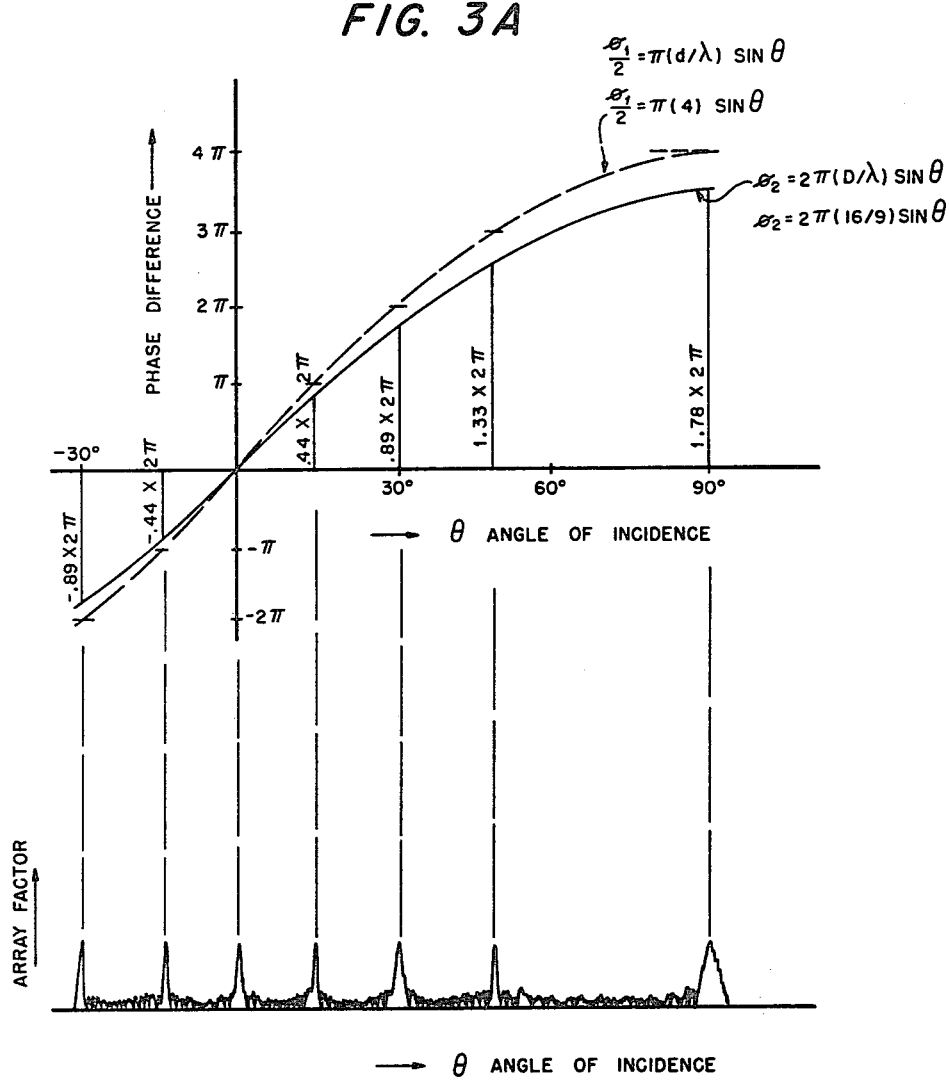

The invention described herein may be manufactured and used by or for the Government of the United States of America for governmental purposes without the payment of any royalties thereon or therefor.

The invention relates generally to a receiving antenna system capable of distinguishing between received signals from the main and grating lobes. More specifically the invention uses a linear antenna array which has a grating lobe pattern of significant amplitude relative to the main lobe but which provides a means of identifying reflections from the grating lobe thereby eliminating the source of error usually present in such arrays.

It is a general object of antenna designs for radar systems to provide for a receiving pattern with low amplitude grating lobes. If too large a portion of the radiated energy is contained in the grating lobes there would be a reduction in the main beam energy with a consequent lowering of maximum gain. Strong reflections received from the grating lobes could enter the receiver and appear as false targets. If a linear antenna array is employed, grating lobes present no serious problem when the spacing between the elements is kept less than a half wavelength. However, practical reasons may dictate the use of a linear array in which the element spacing is greater than a half wavelength thereby creating significant grating lobe amplitudes. Among these factors which might demand such a spacing in a linear array are cost, mutual coupling of elements and main beam width. With such an antenna array it is advantageous to be able to identfy grating lobe returns thereby making it possible to eliminate a serious source of error, confusion and ambiguity.

It is therefore an object of the invention to provide a receiving antenna system using a linear antenna array with the capability of eliminating ambiguities due to the presence of grating lobes.

It is a further object to provide an antenna system with the capability of identifying the particular grating lobe through which the incoming signal is received.

The above objects are accomplished in the invention by measuring the phase difference between staggered linear arrays and utilizing the obtained phase difference to ascertain whether the received signal has resulted from the main lobe or a grating lobe and further along which particular grating lobe it was received.

A more complete description of the invention with all its advantages will follow with reference to the drawings.

FIG. 1 shows a linear array for illustrative purposes.
FIG. 2 shows an antenna array with associated circuits of the invention.
FIG. 3 is a graph showing phase difference and array factor of a system shown in FIG. 2.

The invention can best be understood by first considering an ordinary linear array as shown in FIG. 1 comprising elements 1–4. The elements are separated by a distance $d$. The array factor for such an array is given by $$G_a(\theta) = \frac{\sin^2[N\pi(d/\lambda)\sin\theta]}{N^2\sin^2[\pi(d/\lambda)\sin\theta]}$$

where $N$ = number of elements
$d$ = spacing between elements
$\lambda$ = wavelength
$\theta$ = angle with respect to boresight.

The difference in phase of the signals in adjacent elements will be given by the equation:

$$\phi_1 = 2\pi(d/\lambda)\sin\theta$$

As noted previously, if $d$ in the above equation is less than a half wavelength, grating lobes will be non-existent. However, when $d$ becomes greater than half a wavelength, grating lobes will appear in the antenna pattern with an amplitude comparable with that of the main lobe. These grating lobes are due to radiation from a particular direction adding in phase in the elements when the relative paths to these elements differ by an integral multiple of $2\pi$. In summary, considering FIGURE 1 it can be said that when the spacing between elements is greater than a half wavelength, significant grating lobes are present. The phase difference between signals in two adjacent elements is zero, when the signal is being received through a main lobe and is an integral multiple of $2\pi$ when received through a grating lobe. However it is not possible to distinguish between a difference of 0, $2\pi$, $4\pi$ etc. by conventional measurement techniques and it is thus not possible to utilize the above information to get any usable results concerning grating lobe locations. Thus since the grating lobes occur when the difference in phase between elements in an integer multiple of $2\pi$ it is not possible to use the phase information to identify the occurrence of a return through a grating lobe. This is illustrated by the plot of $\phi_{1/2}$ of FIG. 3 where it is demonstrated that, in a linear array the grating lobes occur when the phase difference between adjacent elements is an integer multiple of $2\pi$.

Next consider an additional array which differs from the first array by no more than a linear displacement $D$ in the plane of the array. FIG. 2 shows the displaced array with its elements 6–9 along with the original array with its elements 1–4. The sum of the signals present in the displaced array at a particular frequency will be present on line 10 and the sum of the original array on line 5. Clearly the displaced array will have the same antenna pattern as the original array. Thus the voltages on lines 5 and 10 will be equal in magnitude but will have a phase shift $\phi_2$ relative to one another given by the equation $$\phi_2 = 2\pi(D/\lambda)\sin\theta$$

By measuring the phase difference between the original and displaced array it is possible to distinguish between a main lobe and side lobe signals. The phase shift $\phi_2$ will be equal to zero only if the source of radiation is in the direction of antenna boresight, as may be visualized easily since this is the only case in which the source is equidistant from both arrays. The phase shift $\phi_2$ will be different from zero at all other angles of incidence $\theta$, and will be different from integer multiples of $2\pi$ at the location of grating lobes if the displacement $D$ is chosen properly.

To implement the invention, one would therefore have to measure the phase difference of signals received at the same frequency and at the same time by the two arrays, and one would decide from this measurement whether the signal was received through the main lobe, or a grating lobe and may further evaluate $\phi_2$ to determine exactly which grating lobe would be pointing in the direction of the signal source.

As an illustration, consider two arrays each having 10 elements arranged as in FIG. 2, and having an element spacing $d$ equal to four wavelengths, and the staggering ratio chosen to equal $$\frac{D}{d-D} = \frac{4}{5}$$

since $\phi_2 = 2\pi D/\lambda \sin \theta$ and $$D = \frac{4}{9}d$$

we obtain $$\phi_2 = 2\pi \frac{4}{9} d/\lambda \sin \theta = 2\pi \frac{16}{9} \sin \theta$$

A graphical display of the array factor and the phase shift of the above system is shown in FIG. 3. $\phi_2$ of FIG. 3 is a graph of the phase difference between the two arrays as a function of angle of incidence. In FIGURE 3B is drawn a graph of the array factor of the given antenna system. It is seen by examining $\phi_2$ and the array factor that the grating lobes occur at other than multiples of $\pi$. Thus by a proper selection of D and $d$ the function $\phi_1/2$ is shifted such that the grating lobes occur at other than integer multiples of $\pi$. Thus the previous difficulty of identifying between phase differences of 0, $2\pi$ etc. is eliminated since now each grating lobe is associated with a peculiar phase difference not an integer multiple of $2\pi$. Where before it was not possible to distinguish between 0 and $2\pi$ on line 11, it is now possible to distinguish the value of $.89 \times 2\pi$ from zero. The staggering of the antenna elements has the effect of making the event, "$\phi_2$=integer multiple of $2\pi$" coincide with a small antenna sidelobe or with a null of the pattern.

FIG. 2 shows the elements of a complete system including filters 11 and 12 to insure that the phase measurements are made with respect to the same signal in both arrays as demanded by the equations mentioned above. The phase meter 13 can be of a conventional type which produces a control voltage proportional to the difference in phase between the signals at the outputs of the filters. It should be apparent to one skilled in the art that the processing circuitry 14 could be designed to utilize the phase information obtained in this manner in various ways. For instance it could be used to blank a radar receiver at points indicating reception through a grating lobe. In addition the phase difference can be utilized to identify the direction of the grating lobe so that this information can be used to compensate for any error that may occur.

Several values of D and $d$ can be chosen to produce satisfactory results. It is only necessary that the particular values produce phase differences other than integer multiples of $2\pi$ between the two arrays at the occurrence of grating lobes. To fulfill this requirement the arrays must be staggered, that is, the distance of displacement of one array with respect to the other must be different than half the distance between adjacent elements of the same array. It is the irregularity produced by staggering which causes the phase difference between the arrays to be other than integer multiples of $2\pi$ upon the occurrence of grating lobes.

Numerous and varied arrangements embodying the principles of the invention of which the above described embodiment is illustrative will readily occur to those skilled in the art. No attempt to exhaustively illustrate all possible such arrangements has been made. Other possible applications of the invention are in radio astronomy, sonar and seismic systems. The invention may also be applied to arrays other than linear, such as planar, circular or cylindrical by using the staggering technique embodied in the disclosure.

What is claimed and desired to be secured by Letters Patent of the United States is:

1. A receiving antenna system comprising:
   a first antenna array with equally spaced receiving elements,
   a second array comprising equally spaced elements located between adjacent elements of said first array, the distance from each element of said second array to one adjacent element of said first array being different than the distance from said element in second array to its other adjacent first array element,
   the number of elements in said first array being equal to the number of elements in said second array,
   means for measuring the phase difference between the signals originating from the same source in said first and second arrays.

2. The system as recited in claim 1 further including means coupled to said measuring means and said arrays to inhibit the processing of received signals when said measuring means indicates the presence of grating lobe radiation.

3. The system as recited in claim 1 wherein said means for measuring comprises:
   filter means coupled to each array for passing signals from the same source from said arrays,
   means coupled to said filter means for producing a voltage proportional to the difference in phase between the signals in said first and second arrays.

4. A receiving antenna system comprising:
   a first antenna array with equally spaced receiving elements located along a straight line,
   a second antenna array with equally spaced receiving elements, each element intersecting said straight line and being displaced a distance from said first array,
   adjacent elements of said first array having one element of said second array located therebetween, and
   means for measuring the phase between the signals in said two arrays.

5. The system of claim 4 wherein said measuring means comprises:
   means for generating a first voltage equal to the sum of the signals in said first array,
   means for generating a second voltage equal to the sum of the signals in said second array,
   filter means coupled to each of said summing means for passing a preselected wavelength,
   means for producing a voltage wavelength,
   means for producing a voltage proportional to the phase difference between said first and second voltages.

6. An antenna receiving system comprising:
   a first linear array,
   a second linear array, displaced from said first array and having elements located such that the phase difference between the sum of the signals in said first array and the sum of the signals in said second array is equal to values other than integer multiples of $2\pi$ upon reception of signals through a grating lobe,
   means for measuring said phase difference.

7. A method of identifying signals received through the grating lobe of an antenna system comprising the steps of:
   displacing one antenna array with respect to another such that the phase difference between the sum of the signals in said one array and the sum of the signals in said other array is different than an integer multiple of $\pi$ when signals are being received through a grating lobe, and measuring said phase difference to determine the location of said grating lobes.

References Cited

UNITED STATES PATENTS 3,273,144  9/1966  Fishbein.
3,307,193  2/1967  Kaufman.

RODNEY D. BENNETT, Jr., Primary Examiner

RICHARD E. BERGER, Assistant Examiner

U.S. Cl. X.R.

343—100